United States Patent
Hsu

(10) Patent No.: US 10,859,862 B2
(45) Date of Patent: Dec. 8, 2020

(54) DISPLAY APPARATUS

(71) Applicant: Coretronic Corporation, Hsin-Chu (TW)

(72) Inventor: Jeng-Bin Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/522,668

(22) Filed: Jul. 26, 2019

(65) Prior Publication Data
US 2020/0041832 A1 Feb. 6, 2020

(30) Foreign Application Priority Data
Jul. 31, 2018 (CN) .......................... 2018 1 0857108

(51) Int. Cl.
G02F 1/1333 (2006.01)

(52) U.S. Cl.
CPC .... G02F 1/133308 (2013.01); G02F 1/13338 (2013.01); G02F 2001/133314 (2013.01); G02F 2001/133331 (2013.01); G02F 2201/46 (2013.01)

(58) Field of Classification Search
CPC .......................................... G02F 2001/133331
See application file for complete search history.

(56) References Cited

U.S. PATENT DOCUMENTS

| 2013/0135552 A1* | 5/2013 | Huang | G02F 1/133308 349/58 |
| 2014/0085796 A1* | 3/2014 | Mathew | G06F 1/1609 361/679.21 |
| 2017/0192156 A1* | 7/2017 | Song | G02B 6/0038 |

FOREIGN PATENT DOCUMENTS

| CN | 102981294 A | 3/2013 |
| CN | 206348566 U | 7/2017 |

\* cited by examiner

Primary Examiner — Alexander P Gross

(57) ABSTRACT

A display apparatus includes a back plate, a plurality of first magnetic components, a display module and second magnetic components. The back plate has a bottom wall and a carrying portion. The carrying portion is connected to the bottom wall and located at a periphery of the bottom wall. A plurality of first magnetic components is disposed on the carrying portion. The display module includes a first substrate. The carrying portion supports an edge of the first substrate. The second magnetic components are disposed to the edge of the first substrate and disposed oppositely to the first magnetic components respectively. The first magnetic components and the second magnetic components are coupled to each other by a magnetic force.

9 Claims, 3 Drawing Sheets

DISPLAY APPARATUS

CROSS-REFERENCE TO RELATED APPLICATION

THIS APPLICATION CLAIMS THE PRIORITY BENEFIT OF CHINA APPLICATION (CN201810857108.0), FILED ON 2018 Jul. 7, 31. THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display apparatus, and more particularly to a fixing structure for a display module.

BACKGROUND OF THE INVENTION

Portable smart electronic products are necessities for modern people's lives. No matter consumers or entrepreneurs, in addition to essential functions, the requirements for lightness, thinness, power-saving, strength, and even product appearance of electronic products are getting higher and higher. There is a further requirement for visual taste on portable display apparatuses. In addition to a use of lightweight and sturdy materials, entrepreneurs also develop and design on an assembly structure.

A display apparatus includes assemblies such as a display module and a backlight module and structural components such as an exterior frame and a back plate. The back plate is generally used as a base of a supporting assembly. The backlight module and the display module are sequentially assembled on the back plate. The exterior frame is combined with the back plate to fix interior assemblies. The display module can also be directly fixed to the back plate. For example, the display module is combined with its exterior structures such as a protective cover and structural components such as a back plate. The structural components may also be an interior frame or a buffer member, etc. The conventional combination method is usually a double-sided bonding tape. One side is adhered to the structural components, and the other side is adhered to the protective cover. However, the double-sided bonding tape has limited an adhesive force. Therefore, it must be enlarged by superficial area to provide an effective bonding force. However, a larger area necessarily occupies more space, which is not conducive to the light and thin development trend of display apparatuses, and it is also unhelpful to narrow the frame and maximize the display area.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display apparatus, which is convenient to assemble, dismantle and reduces a use of expendable materials.

Other advantages and objects of the invention may be further illustrated by the technical features broadly embodied and described as follows.

In order to achieve one or a portion of or all of the objects or other objects, an embodiment of the invention provides a display apparatus, which includes a back plate, a plurality of first magnetic components, a display module and second magnetic components. The back plate has a bottom wall and a carrying portion. The carrying portion is connected to the bottom wall and located at a periphery of the bottom wall. The plurality of first magnetic components is disposed on the carrying portion. The display module includes a first substrate, and the carrying portion supports an edge of the first substrate. The second magnetic components are disposed to the edge of the first substrate and disposed oppositely to the plurality of first magnetic components respectively. The plurality of first magnetic components and the plurality of second magnetic components are coupled to each other by a magnetic force.

The display apparatus of the embodiment of the invention adopts a method of the first magnetic components and the second magnetic components coupled to each other by a magnetic force to make the display module fixed on the back plate. Therefore, a use of expendable materials (such as a tape) in an assembly of the display apparatus can be reduced, and there is no problem of residual glue in the dismantling and rework. Moreover, the easiness of dismantling and rework is improved by degaussing or moving at least one of the first magnetic components and the second magnetic components. Furthermore, the invention fastens the display module on the back plate by a magnetic adsorption force between the first magnetic components and the second magnetic components and is advantageous for narrow design of the frame of the display apparatus.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
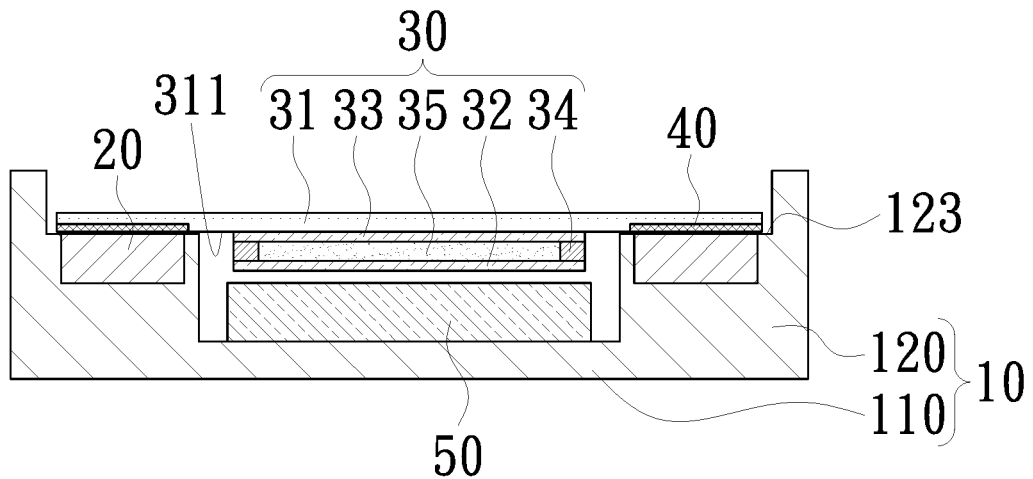
FIG. 1 is a schematic cross-sectional view of a display apparatus according to an embodiment of the invention.

FIG. 1 is a schematic cross-sectional view of a display apparatus according to an embodiment of the invention. As shown in FIG. 1, a display apparatus 1 includes a back plate 10, a plurality of first magnetic components 20, a display module 30 and second magnetic components 40. The back plate 10 has a bottom wall 110 and a carrying portion 120. The carrying portion 120 is connected to the bottom wall 110 and located at a periphery of the bottom wall 110. The back plate 10 may be a plastic material or a metal material (such as an aluminum alloy), but is not limited thereto. In an embodiment, the bottom wall 110 is substantially quadrangular, and correspondingly the carrying portion 120 includes, for example, four wall bodies distributed along a periphery of bottom wall 110, or two wall bodies distributed on two opposite sides of the bottom wall 110, for example, two opposite long sides or two opposite short sides. In other embodiments, the carrying portion 120 may include a plurality of wall bodies distributed and spaced apart at appropriate distances on the bottom wall 110.

The first magnetic components 20 are disposed on the carrying portion 120. For example, the first magnetic components 20 are, for example, disposed on the carrying portion 120 located on two opposite sides of the bottom wall 110. Since FIG. 1 is a schematic cross-sectional view, a quantity of first magnetic components 20 located on the left and right sides is one respectively, but substantially a quantity of first magnetic components 20 located on the left and right sides may be plural respectively. In addition, in an embodiment in which the carrying portion 120 are continuously distributed on any of two opposite sides of the bottom wall 110, the first magnetic components 20 located on the same side are, for example, disposed and spaced apart from each other. In an embodiment in which the carrying portion 120 is distributed and spaced apart at a periphery of the bottom wall 110, the carrying portion 120 is provided with the first magnetic components 20 individually or partially. The first magnetic components 20 may be coupled to a surface of the carrying portion 120 by a viscous material or a fastening structure, or embedded in the carrying portion 120. In an embodiment, the carrying portion 120 has a surface facing the first substrate 31, and the surface serves as a top surface 123. As shown in FIG. 1, the first magnetic components 20 are embedded in the carrying portion 120 and exposed to the top surface 123.

The detailed structure of the display module 30 and the second magnetic components 40 of the display apparatus 1 of the embodiment will be further described below.

As shown in FIG. 1, the display module 30 includes a first substrate 31, and the carrying portion 120 supports an edge of the first substrate 31. The edge includes at least edge portion of the surface 311 of the first substrate 31 facing the bottom wall 110. In other embodiments, the edge may further include broadsides of first substrate 31. The second magnetic components 40 are disposed at the edge of the first substrate 31 and disposed oppositely to the plurality of first magnetic components 20 respectively. The second magnetic components 40 are, for example, at least partially disposed on the surface 311 of the first substrate 31 facing the bottom wall 110. When the carrying portion 120 supports the first substrate 31, the second magnetic components 40 are substantially directly above the carrying portion 120. The second magnetic components 40 may be coupled to the edge of the first substrate 31 by a viscous material or a fastening structure, or embedded in the first substrate 31. In an embodiment, the second magnetic component 40 is formed by a ferromagnetic metal material coated on the edge of the first substrate 31. The second magnetic components 40 and the first magnetic components 20 are coupled to each other by a magnetic force, so that the first substrate 31 is adsorbed to the back plate 10 and the carrying portion 120. The first magnetic components 20 may be permanent magnets, which may be natural or artificial. The second magnetic components 40 may be permanent magnets or ferromagnetic metal components which can be adsorbed by permanent magnets, such as iron, cobalt, nickel, but is not limited thereto.

As shown in FIG. 1, the display module 30 further includes a second substrate 32, a third substrate 33 and a display medium layer 35. The third substrate 33 is connected to the surface 311 of the first substrate 31 facing the bottom wall 110. The display medium layer 35 is, for example, sealed between the second substrate 32 and the third substrate 33 by a frame sealant 34. The first substrate 31, the second substrate 32 and the third substrate 33 may include a light transmissive substrate, such as a glass substrate, a plastic substrate or a quartz substrate, but is not limited thereto. The third substrate 33 may be coupled to the first substrate 31 by an optical tape or an optically transparent resin, but is not limited thereto. In an embodiment, the display module 30 is, for example, a liquid-crystal display module. The first substrate 31 is a protective cover or a touch panel. The second substrate 32 includes, for example, a pixel array and peripheral circuits. The third substrate 33 includes, for example, a color filter layer. The display medium layer 35 includes a plurality of liquid crystal molecules. The invention does not limit a type of display module 30. In addition, in an embodiment in which the first substrate 31 is a protective cover, the display module 30 may further include touch sensing circuits disposed on at least one of the second substrate 32 and the third substrate 33, but is not limited thereto.

As shown in FIG. 1, in an embodiment in which the display medium layer 35 is in a non-self-illuminating form, the display apparatus 1 may further include a backlight module 50 disposed between the bottom wall 110 and the display module 30. The backlight module 50 may be an edge-type backlight module or a direct-type backlight module, but is not limited thereto. In an embodiment, the backlight module 50 includes a light source and a light guide plate. The light source is, for example, a light emitting diode light source, a cold-cathode fluorescent lamp or other appropriate light sources. In an embodiment, the backlight module 50 further includes an optical film.

Figure 2:
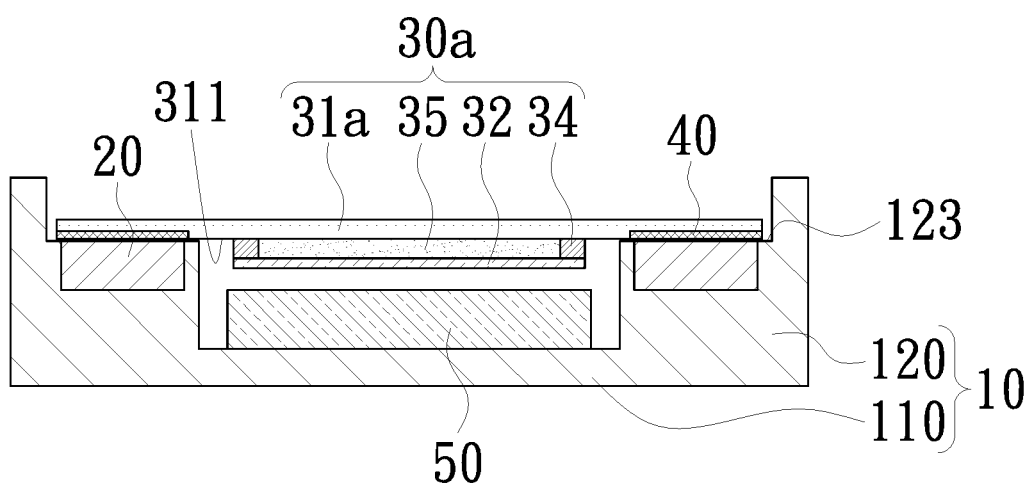
FIG. 2 is a schematic cross-sectional view of a display apparatus according to another embodiment of the invention.

In another embodiment as shown in FIG. 2, the display module 30a of the display apparatus 1a includes a first substrate 31a, a second substrate 32 and a display medium layer 35. The display medium layer 35 is, for example, sealed between the second substrate 32 and the first substrate 31a by a frame sealant 34. In an embodiment in which the display module 30a is a liquid-crystal display module, the first substrate 31a may include a color filter layer, and the second substrate 32 includes a pixel array and peripheral circuits. In addition, the display module 30a may further include touch sensing circuits disposed on at least one of the first substrate 31a and the second substrate 32, but is not limited thereto.

In the embodiment of FIG. 1 and FIG. 2, the second magnetic components 40 on the first substrates 31/31a are adsorbed by the first magnetic components 20 on the carrying portion 120, so as to fix the display module 30/30a on the back plate 10. As such, the use of expendable materials such as a tape can be reduced. Moreover, the display module 30/30a and the back plate 10 can be easily dismantled and reworked through the degaussing of the first magnetic components 20. Furthermore, the fastening between the display modules 30/30a and the back plate 10 is mainly through a magnetic absorption force, and the magnetic absorption force can be enhanced by a selection of materials, so that using the first magnetic components 20 and the second magnetic components 40, which are small sizes, is advantageous to the narrowing design of the frame of the display apparatuses 1/1a.

Figure 3:
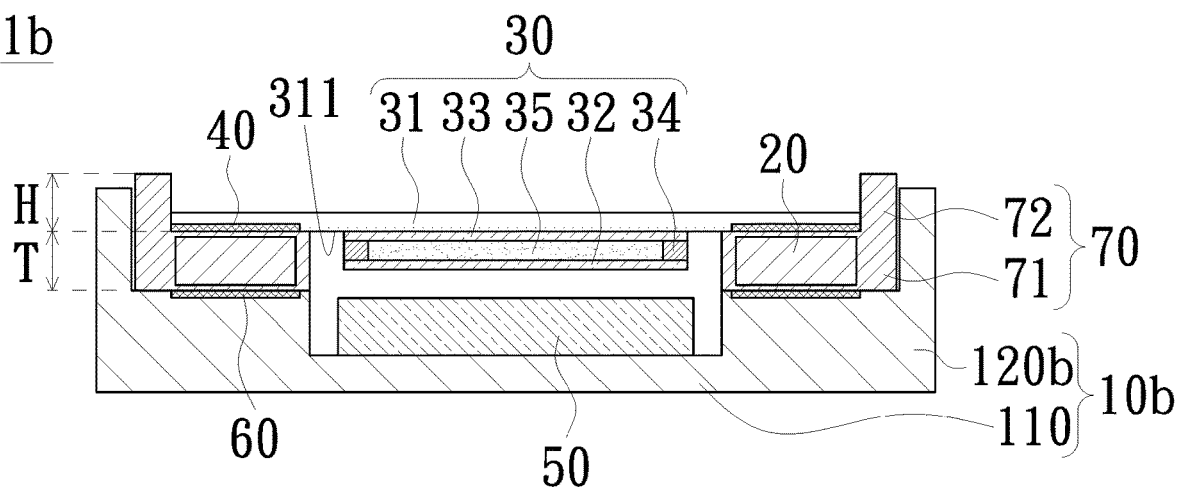
FIG. 3 is a schematic cross-sectional view of a display apparatus according to another embodiment of the invention.

FIG. 3 is a schematic cross-sectional view of a display apparatus according to another embodiment of the invention. As shown in FIG. 3, the display apparatus 1b includes a back plate 10b, a plurality of first magnetic components 20, a display module 30, a plurality of second magnetic components 40 and a buffer member 70. A main difference between the embodiment and the embodiment shown in FIG. 1 lies in the buffer member 70. The back plate 10b of the display apparatus 1b has a bottom wall 110 and a carrying portion 120b. The carrying portion 120b is connected to the bottom wall 110 and located at a periphery of the bottom wall 110. Compared to the carrying portion 120 shown in FIG. 1, the carrying portion 120b may have a lower height, but is not limited thereto. The first magnetic components 20 are disposed on the carrying portion 120b. In details, the first magnetic components 20 are disposed above the carrying portion 120b and located in the buffer member 70 between the carrying portion 120b and the edge of the first substrate 31. The carrying portion 120b supports the edge of the first substrate 31 by a buffer member 70. A manufacturing method of the first magnetic components 20 disposed in the buffer member 70 is, for example, by coating the first magnetic components 20 when the buffer member 70 is injection molded, but is not limited thereto. In other embodiments, the first magnetic components 20 may be adhered to the buffer member 70 surface by, for example, a viscous material or a fastening structure.

A material of the buffer member 70 is more flexible and variability than the material used for the back plate 10b. For example, the buffer member 70 is a gel material, and the back plate 10b is an aluminum alloy back plate, but is not limited thereto. In an embodiment, the buffer member 70 is presented as a frame body, which is integrally formed or combinedly mounted on the carrying portion 120b, so as to specifically frame or define an interior range. In another embodiment, the buffer member 70 may include a plurality of components disposed on the carrying portion 120b, distributed and spaced apart or relatively distributed. For example, in an embodiment in which the bottom wall 110 is quadrangular, and the components are mounted in pairs on the carrying portion 120b on opposite sides of the bottom wall 110, but is not limited thereto.

The buffer member 70 may be a sheet with an appropriate thickness and has an extended direction. As shown in FIG. 3, the buffer member 70 includes a supporting portion 71 with an appropriate thickness T. One of two opposite surfaces of the supporting portion 71 is facing the edge of the first substrate 31, and the other is facing the carrying portion 120b. The buffer member 70 further includes an upright portion 72, which is extended from the outside of the supporting portion 71 away from the carrying portion 120b by an appropriate height H.

The buffer member 70 may be fixed, such as adhering or other methods, on the carrying portion 120b. For example, the display apparatus 1b may further include a plurality of third magnetic components 60 fixed to the carrying portion 120b and disposed oppositely to the first magnetic components 20. The first magnetic components 20 and the third magnetic components 60 are coupled to each other by a magnetic force, so that the buffer member 70 is fixed on the carrying portion 120b. The third magnetic components 60 are similar to the second magnetic components 40, which may be permanent magnets or ferromagnetic metal components. Their possible structures are also similar, and no redundant detail is to be given herein.

The display apparatus 1b of the embodiment in addition to having the advantages of the display apparatus 1, due to having the buffer member 70, which can provide the display module 30 for buffering and protection of vibration. The buffer member 70 can adjust the suitability between the display module 30 and the back plate 10b, so as to strengthen the interior structure of the display apparatus 1b. In addition, the display module 30 of the embodiment may also be replaced with the display module 30a of FIG. 2.

Figure 4:
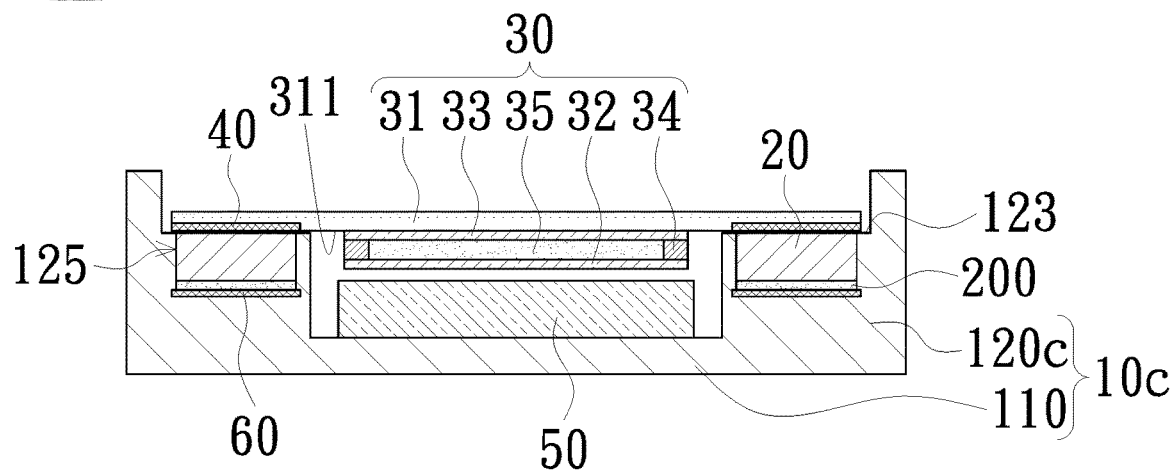
FIG. 4 is a schematic cross-sectional view of a display apparatus according to another embodiment of the invention.

FIG. 4 is a schematic cross-sectional view of a display apparatus according to another embodiment of the invention. As shown in FIG. 4, the display apparatus 1c includes a back plate 10c, a plurality of first magnetic components 20, a display module 30, second magnetic components 40, at least one insulating sheet 200 and a plurality of third magnetic components 60. A main difference between the embodiment and the embodiment as shown in FIG. 1 lies in the insulating sheets 200 and the third magnetic components 60. The back plate 10c of the display apparatus 1c has a bottom wall 110 and a carrying portion 120c. The carrying portion 120c is connected to the bottom wall 110 and located at a periphery of the bottom wall 110. The plurality of first magnetic components 20 are disposed on the carrying portion 120c and fixed on the insulating sheets 200. The plurality of third magnetic components 60 are disposed to the carrying portion 120c, which are opposite to the plurality of first magnetic components 20, and coupled to each other by a magnetic force. In an embodiment, a material of the insulating sheets 200 is not ferromagnetic, not combined with the first magnetic components 20 and the third magnetic components 60 by a magnetic force, and the insulating sheets 200 may be a film, but is not limited thereto. The insulating sheets 200 are, for example, located between the third magnetic components 60 and the first magnetic components 20, but are not limited thereto.

In the embodiment, the plurality of first magnetic components 20 may be disposed on the same insulating sheets 200, or disposed on the different insulating sheets 200 respectively, and are adhered to the insulating sheets 200 by, for example, a viscous material and a fastening structure. The third magnetic components 60 are similar to the second magnetic components 40, may be permanent magnets or ferromagnetic metal components. Their possible structures are also similar, and no redundant detail is to be given herein.

In an embodiment, a quantity of the insulating sheets 200 is, for example, two, and presents a long strip-shape respectively. The two insulating sheets 200 are provided with the plurality of first magnetic components 20 respectively. The insulating sheets 200 are disposed on a surface such as the top surface 123 of the carrying portion 120c or embedded in the carrying portion 120c, but are not limited thereto, for example, which may also be matchedly disposed to the buffer members 70. Furthermore, the insulating sheets 200 are fixed to the carrying portion 120c by a magnetic adsorption force between the first magnetic components 20 and the third magnetic components 60.

As shown in FIG. 4, the carrying portion 120c has grooves 125 configured to accommodate the insulating sheets 200 and the first magnetic components 20. The grooves 125 preferably have openings located, for example, on the top surface 123. For example, the grooves 125 formed on the carrying portion 120c to accommodate the insulating sheets 200 which present long strip-shape. In this case, the insulating sheets 200 are movably accommodated in the grooves 125 in the extending direction of the length and can lead the first magnetic components 20 on which moved in the grooves 125.

Figure 5A:
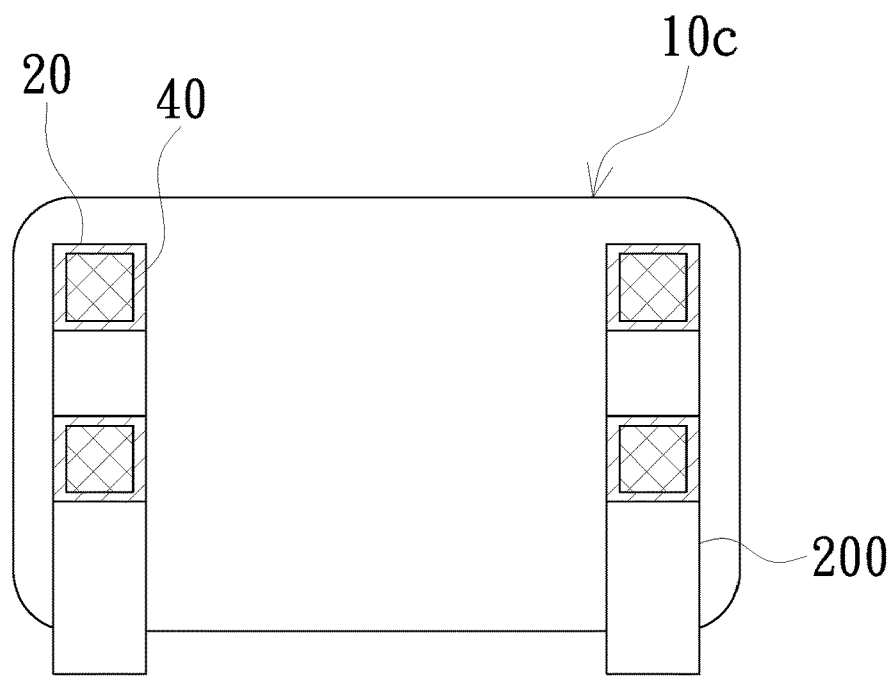
FIG. 5A is a schematic view showing the relative position when the first magnetic components attracting the second magnetic components of FIG. 4.
Figure 5B:
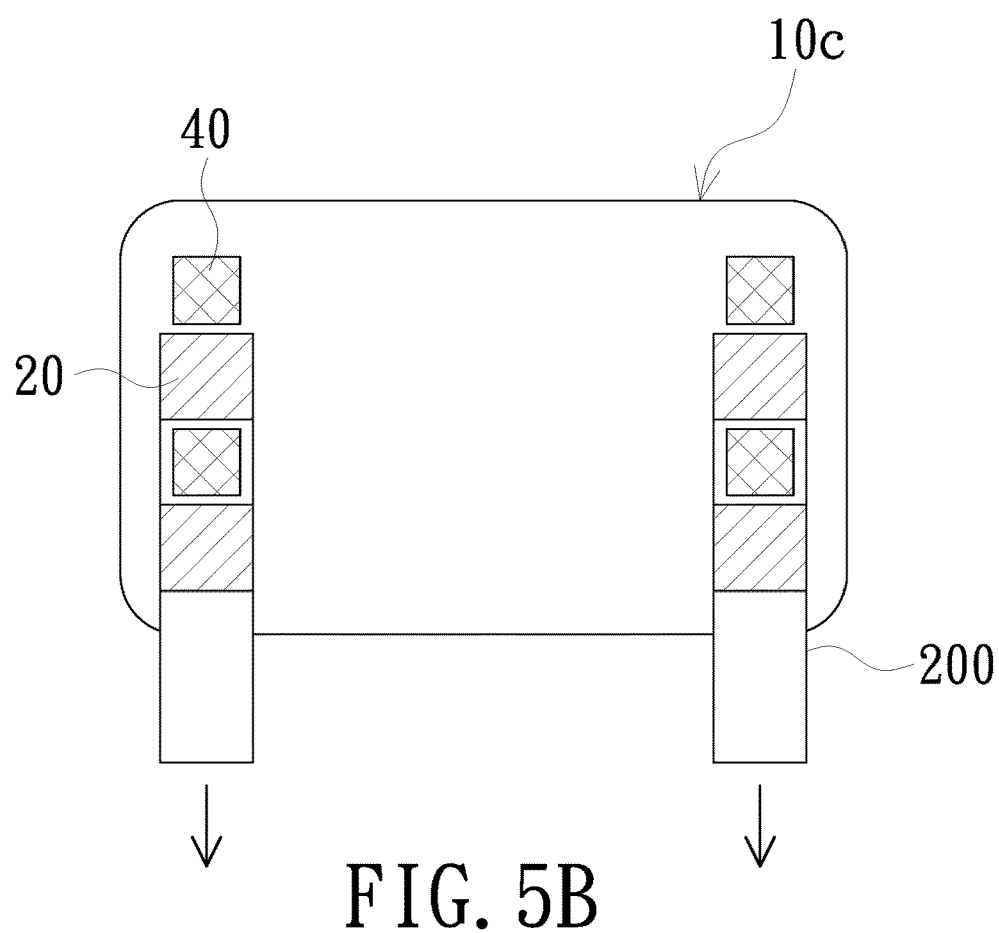
FIG. 5B is a schematic view showing the relative position when the first magnetic components not attracting the second magnetic components of FIG. 4.

FIG. 5A is a schematic view showing the relative position when the first magnetic components 20 attracting the second magnetic components 40 of FIG. 4, and FIG. 5B is a schematic view showing the relative position when the first magnetic components 20 not attracting the second magnetic components 40 of FIG. 4. As shown in FIG. 4 and FIG. 5A, the carrying portion 120c located on the short sides of the bottom wall 110 forms the grooves 125, and the grooves 125 extend along the direction of the short sides and open at two ends of the carrying portion 120c. The insulating sheets 200 present rectangular strip-shape and have the plurality of first magnetic components 20 disposed and spaced apart at appropriate distances. The insulating sheets 200 are accommodated in the grooves 125 and can be moved linearly and upwardly in the direction of the short sides, so as to drive the first magnetic components 20 to move in the grooves 125 and displace relative to the back plate 10c.

In addition, a quantity of the first magnetic components 20 and a quantity of the third magnetic components 60 are the same and correspond respectively, and a quantity of the second magnetic components 40 and a quantity of the first magnetic components 20 are the same and correspond respectively. In FIG. 5A and FIG. 5B, since the third magnetic components 60 are covered by the second magnetic components 40, the third magnetic components 60 are not shown in FIG. 5A and FIG. 5B. In the embodiment, the insulating sheets 200 can extend out of the back plate 10c, and the extending portions serve as operating portions of the insulating sheets 200. The embodiment as shown in FIG. 5B, the insulating sheets 200 are moved upwardly and linearly in the direction of the short sides, for example, by artificiality or machine through the operating portions to move it (as indicated by the arrow below). The insulating sheets 200 lead the displacement of the first magnetic components 20 relative to the second magnetic components 40 and the third magnetic components 60, and separate from each other without attracting. Furthermore, the first substrate 31 due to reduction of magnetic adsorption force is not fixed to the back plate 10c by a magnetic force, so that the display module 30 and the back plate 10c can be departed easily. The second magnetic components 40 and the third magnetic components 60 may be permanent magnets or ferromagnetic metal components, and the magnetic properties are preferably weaker than the first magnetic components 20. When the first magnetic components 20 move away, the first substrate 31 and the back plate 10c either lose magnetic adsorption force, or even if they are attracted to each other, the display module 30 still can be easily separated from the back plate 10c by an appropriate force. In addition, the display module 30 of the embodiment may also be replaced with the display module 30a of FIG. 2.

In an embodiment, the display apparatus 1c further includes a shell, which is covered with a semi-finished product combined with the back plate 10c and the display module 30. The operating portions of the insulating sheets 200 may further extend from a seam of the semi-finished product and the shell, or form a hole or a seam on the shell to make the operating portion extended, so as to facilitate pulling the insulating sheet 200 to drive the first magnetic components 20 to move.

In summary, the display apparatus of the embodiment of the invention adopts a method of the first magnetic components and the second magnetic components coupled to each other by a magnetic force to make the display module fixed on the back plate. Therefore, the use of expendable material (such as a tape) in an assembly of the display apparatus can be reduced, and there is no problem of residual glue in the dismantling and rework. Moreover, the easiness of dismantling and rework is improved by degaussing or moving at least one of the first magnetic components and the second magnetic components. Furthermore, the invention fastens the display module on the back plate by a magnetic adsorption force between the first magnetic components and the second magnetic components and is advantageous for narrow design of the frame of the display apparatus.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first substrate, the second substrate, the first magnetic components and the second magnetic components are only used for distinguishing various elements and do not limit the number of the elements.

What is claimed is:

1. A display apparatus, comprising a back plate, a plurality of first magnetic components, a display module, second magnetic components, at least one insulating sheet and a plurality of third magnetic components, wherein
    the back plate has a bottom wall and a carrying portion, and the carrying portion is connected to the bottom wall and located at a periphery of the bottom wall;
    the plurality of first magnetic components is disposed on the carrying portion, wherein the plurality of the first magnetic components are embedded in the carrying portion and exposed by a top surface of the carrying portion;
    the display module comprises a first substrate, and the carrying portion supports an edge of the first substrate;
    the second magnetic components are disposed on the edge of the first substrate and disposed oppositely to the plurality of first magnetic components respectively, and the plurality of first magnetic components and the second magnetic components are coupled to each other by a magnetic force, wherein
    the plurality of first magnetic components are fixed on the at least one insulating sheet; and
    the plurality of third magnetic components are fixed on the carrying portion and disposed oppositely to the plurality of first magnetic components, wherein the at least one insulating sheet is located between the plurality of third magnetic components and the plurality of first magnetic components, and the plurality of first magnetic components and the plurality of third magnetic components are coupled to each other by a magnetic force.

2. The display apparatus according to claim 1, wherein the plurality of first magnetic components are permanent magnets, the second magnetic components are ferromagnetic metal components or permanent magnets, and the plurality of third magnetic components are ferromagnetic metal components or permanent magnets.

3. The display apparatus according to claim 1, wherein the plurality of first magnetic components are permanent magnets, and the second magnetic components are ferromagnetic metal components or permanent magnets.

4. The display apparatus according to claim 1, wherein the first substrate is a protective cover or a touch panel, the display module further comprises a second substrate, a third substrate and a display medium layer, the third substrate is connected to a surface of the first substrate facing the bottom wall, and the display medium layer is sealed between the second substrate and the third substrate.

5. The display apparatus according to claim 1, wherein the first substrate is a protective cover or a touch panel, the display module further comprises a second substrate and a display medium layer, and the display medium layer is sealed between the second substrate and a surface of the first substrate facing the bottom wall.

6. The display apparatus according to claim 1, further comprising a backlight source disposed between the bottom wall and the display module.

7. A display apparatus, comprising a back plate, a plurality of first magnetic components, a display module, a buffer member and second magnetic components, wherein
    the back plate has a bottom wall and a carrying portion, and the carrying portion is connected to the bottom wall and located at a periphery of the bottom wall;
    the display module comprises a first substrate, and the carrying portion supports an edge of the first substrate;
    the buffer member disposed between the carrying portion and the edge of the first substrate ;
    the plurality of first magnetic components are disposed in the buffer member; and
    the second magnetic components are disposed on the edge of the first substrate and disposed oppositely to the plurality of first magnetic components respectively, and the plurality of first magnetic components and the second magnetic components are coupled to each other by a magnetic force.

8. The display apparatus according to claim 7, further comprising a plurality of third magnetic components fixed on a top surface of the carrying portion and disposed oppositely to the plurality of first magnetic components, wherein the plurality of first magnetic components and the plurality of third magnetic components are coupled to each other by a magnetic force.

9. The display apparatus according to claim 8, wherein the plurality of first magnetic components are permanent magnets, the second magnetic components are ferromagnetic metal components or permanent magnets, and the plurality of third magnetic components are ferromagnetic metal components or permanent magnets.

* * * * *